(No Model.)
T. T. H. FERGUSON.
SEXTANT ATTACHMENT.
No. 530,830. Patented Dec. 11, 1894.
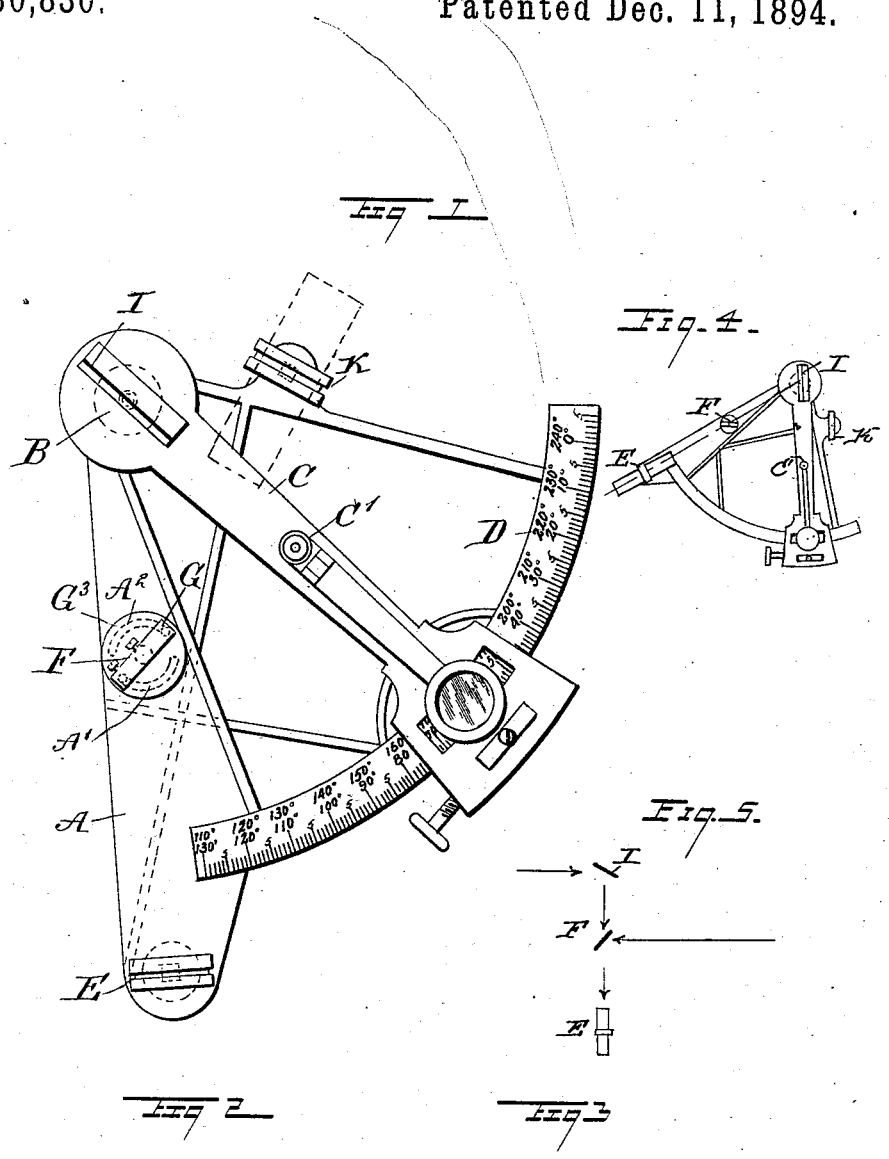
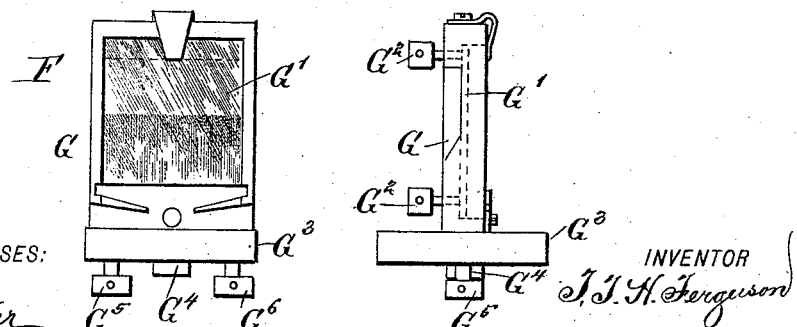
WITNESSES:
H. Walker
C. Sedgwick
INVENTOR
T. T. H. Ferguson
BY
Munn & Co.
ATTORNEYS.

UNITED STATES PATENT OFFICE.

THOMAS T. H. FERGUSON, OF HANKOW, CHINA.

SEXTANT ATTACHMENT.

SPECIFICATION forming part of Letters Patent No. 530,830, dated December 11, 1894.

Application filed November 7, 1893. Serial No. 490,215. (No model.)

*To all whom it may concern:*

Be it known that I, THOMAS TAPLEY HELENUS FERGUSON, of Hankow, China, have invented a new and Improved Sextant Attachment, of which the following is a full, clear, and exact description.

The object of the invention is to provide a new and improved sextant attachment, which is simple and durable in construction, arranged for convenient attachment to the ordinary sextant, and designed to convert the ordinary sextant into a measuring instrument for measuring large angles, say from one hundred and twenty degrees to two hundred and forty degrees, as well as angles from zero to twenty degrees.

The invention consists principally of a full-silvered glass or mirror and a half-silvered glass, of which the latter is substituted for a horizon glass in the plate of the instrument, and the mirror is attached to a vernier indicating on a graduated arc.

The invention also consists of certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 1 is a plan view of the improvement. Fig. 2 is an enlarged face view of the half-silvered glass. Fig. 3 is an end view of the same. Figs. 4 and 5 are diagrammatic views, illustrating the use of the instrument for measuring greater angles than can be measured by the ordinary sextant.

The sextant, of any improved construction, is provided with the usual plate A carrying a pivot B for the vernier C indicating on the graduated arc D forming part of the plate A. On one end of the latter opposite the pivot B, is mounted movable vertically up and down, but not round its own axis a ring E, for supporting the telescope, and between the said ring, which is essentially the same as the other telescope ring K, and on the pivot $G^4$ is mounted to turn, on the plate A, the half-silvered glass F, shown in detail in Figs. 2 and 3.

The half-silvered glass F is provided with a suitably constructed frame G supporting a half-silvered glass G' as indicated in Fig. 2, the said glass being held in place in the frame by set screws $G^2$, which relatively take in the same position as the set screws on the horizon glass of an ordinary sextant. The frame G is provided with a base $G^3$, preferably made circular and provided at its under side and in the center with a pivot $G^4$ extending downward to fit into a corresponding aperture formed in the plate A. On the base $G^3$, on opposite sides of the pivot $G^4$, are held clamping screws $G^5$ and $G^6$, extending through segmental slots A' and $A^2$ respectively, formed in the plate A of the sextant. The segmental slots A' and $A^2$ permit of turning the half-silvered glass F one hundred and twenty degrees, the glass being fastened in place at either end of the slots by the set screws $G^5$ and $G^6$, in such a way, that when the glass F is turned (against clock hands) in its ultimate position it will take in the same position relative to the under glass, as the horizon glass of an ordinary sextant, (*i. e.* parallel.) The free end of the index arm is provided with vernier, tangent screws, &c., exactly like that on other sextants.

The half-silvered glass is placed in the position on the plate A ordinarily occupied by the horizon glass of the sextant, which horizon glass is removed so that the half-silvered glass stands in alignment with the index glass I over the pivot B, and the ring E carrying the telescope.

Between the half-silvered glass F and the index glass I, are arranged the usual four shades, while the other shades are removed so that when two extremely bright objects are to be observed, such as the sun and the reflected sun, the shading is to be done by dark glasses which fit to the eye piece of the telescope, and of which three shades should be provided. Upon the vernier C is provided at C' the usual or any suitable support for a microscope. The graduation on the arc D remains the same, with the exception that immediately above each numeral denoting degrees another is engraved, which, added to the numeral below, will give two hundred and forty degrees. Thus above 0° will come 240°. Above 30° is engraved 210° so as to aggregate two hundred and forty degrees. Above 60° is 180°, above 100° is 140°, &c.

To convert the sextant into a large angle measuring instrument, the horizon or half-silvered glass F is turned in its position, the telescope is taken from its usual ring and screwed or otherwise fastened in the ring E, and the readings are taken from the upper added numerals on the arc D.

Previous to being able to measure large angles the following adjustments have to be made on the sextant:

First. To set the index glass perpendicular to the plane of the sextant the same as is done with ordinary sextants.

Second. To adjust the line of collimation, to set the axis of the telescope at its proper distance from the plane of the sextant, screw on the plain tube, unclamp the index and move it to the right and even off the arc, (for which purpose the first telescope ring has to be removed from its square socket to allow the index arm to pass off the arc,) until on looking through the sight hole over the edge of the silvered portion of the horizon glass, the reflection of the back of the same glass is visible in the index glass. Raise the telescope ring till the reflected edge of the silvered half is visible above the edge itself. Then slowly lower the ring until the reflected edge just disappears. The line drawn from the sight-hole over the edge of the silvered half will then be perpendicular to the axis of the index glass, which is the adjustment required. To set the axis of the telescope parallel to the plane of the sextant, same as with ordinary sextants.

Third. To set the horizon glass perpendicular to the plane of the sextant—turn the arm of the index still farther to the right until the index glass becomes parallel to the horizon glass, both facing to the right. Hold the instrument so that the images of a star or distant terrestrial object reflected in each of the mirrors coincide. If, on moving the index-arm it is found that one of the images passes above or below the other, the horizon glass has to be adjusted by the screw at the top.

Fourth. To set the plane of the horizon glass vertical to that of the index glass when the index of the latter points at 180°, select a good sized well-made plane speculum such as a toilet mirror. Place it on a stand so that it faces some well defined vertical line in the far distance—a flagstaff, or the edge of a building; place yourself in front of the mirror, some distance off say fifteen to twenty feet, and after having temporarily obscured the index glass by raising a few shades, look at the reflection of the mirror in the horizon glass. In the mirror will appear an image of the sextant itself and beyond that the landscape containing the selected vertical line. Get an assistant to slightly move the mirror in vertical and horizontal direction until the image of the vertical line (flagstaff) as seen in the mirror falls behind the reflection of the horizon glass in the same mirror. Part of it will then be visible through the upper part of the horizon glass. Adjust the mirror further so that the image of the horizon glass is bi-sected by the image of the flagstaff behind it. In practice this operation entails no difficulty. With regard to the observer or more accurately, with regard to the middle of the horizon glass, the flagstaff and its image in the mirror will make exactly an angle of one hundred and eighty degrees. If now the shades before the index glass are removed, the image in that glass ought to coincide with the image seen in the mirror. If not, the horizon glass is not adjusted and has to be slightly moved by means of its lower screw till the contact takes place. The position of the horizon glass when arrested by the clamping screws in either position should be accurate enough to enable this adjustment to be dispensed with. In each case, however, the index error has to be found. This can be done for any large angle by measuring the angle and its difference from three hundred and sixty degrees, either by objects on shore, or by stars at sea, or by the horizon on both sides of the observer, in which case the sextant is held vertical. Another way of completing the adjustment or finding the index error, is to select two sharp objects which span an angle of about one hundred and twenty degrees and first measure it with the sextant in its ordinary position and afterward when it is fitted as a large-angle instrument. A great advantage of the large angle sextant, is the possibility of measuring every angle twice, once for its value below one hundred and eighty degrees and once for its value above. By taking several of such sets any error in construction of the sextant, centralization, &c., will become apparent.

As shown in Fig. 4, the sextant is adjusted for measuring greater angles than when adjusted for ordinary work. It will be seen that the telescope is removed from its usual place, at K, and held in the rings E.

Fig. 5 shows the lines of reflection from different objects coinciding in the field of the telescope.

Manipulation of the large-angle sextant is slightly more difficult than that of the ordinary sextant, but with a little practice presents no noteworthy difficulties. After contact is made in the middle of the field of the telescope, this contact will no longer be when both objects are brought above or below the middle line. They will then separate or overlap.

In case the collimation of the telescope is perfect the true angle will be when contact is made in the exact center of the field. However, it is always possible to get the exact angle by gently rocking the instrument so that both objects move from the upper part of the field to the lower, and vice versa. The curves described by each object should just touch without intersecting. The small column which holds the arm to which the microscope is attached, is placed slightly higher up on the index arm, as shown in the drawings. It should not interfere with the line of the vision of the sextant in either position.

This instrument permits latitude to be determined on shore by meridian altitudes of the sun in an artificial horizon when the altitude is from sixty degrees upward. Travelers in low latitudes from about thirty-five degrees north, to thirty-five degrees south have to relinquish this means of determining the latitude for a considerable portion of the year or even throughout the year, and limit themselves to star observations by night, unless they possess elaborate surveying instruments, such as a transit instrument or succeed in finding a natural horizon. For the same reason it adds considerably to the choice of stars for latitude observations in enabling travellers by land to take such stars as should have a meridian altitude exceeding sixty degrees.

Every angle taken by the attachment can be remeasured in a way such as to eliminate instrumental errors. For instance an angle of one hundred and fifty degrees can be remeasured by taking the other angle of two hundred and ten degrees which is also formed by the same lines. The mean of these two observations should always be one hundred and eighty degrees. If not, the difference between this mean and one hundred and eighty degrees is the index error which may be additive or subtractive.

The large-angle sextant might be used in surveying for traversing, which operation, through the frequent occurence of large angles forbids the use of a sextant. Especially in setting out railway curves it might be used with much advantage, even to replace the theodolite.

For use in sounding in a river between two beacons, by clamping the index at one hundred and eighty degrees and looking into the telescope one would be enabled to tell the exact moment when the boat is between the two beacons on the line which unites them.

The attachment may be used in many more cases in which it is imperative to measure large angles quickly, under conditions which preclude the use of instruments which have stands, such as theodolites, &c.

The arrangements of the parts is such, that any ordinary sextant can be readily converted into the combination instrument by an instrument maker of ordinary skill, without the least detriment to either accuracy or ease of working of the sextant itself. The instrument thus produced is therefore, still a sextant, and as none of the usual sextant fittings have been removed beyond a few shades, loses none of its efficiency as a reflecting instrument for measuring angles up to one hundred and thirty degrees. The attachments described above will only add to its efficiency with no other sacrifice but that of adding slightly to the weight of the instrument.

Having thus fully described my invention, I claim as new and desire to secure by Letters Patent—

1. The combination with the frame, graduated arc, pivoted vernier, and other ordinary attachments of a sextant, of a half silvered glass which is movable vertically, and adapted to turn horizontally, and occupies the place of the horizon glass, as shown and described.

2. A sextant attachment, comprising a plate having a graduated arc, a vernier pivoted on the said plate, an index glass held on the pivot end of the vernier, two rings held on the plate and each adapted to carry the telescope, and a half-silvered glass mounted to turn on the said plate in alignment with the index glass and one of the telescope rings, substantially as shown and described.

THOMAS T. H. FERGUSON.

Witnesses:
H. W. PATERSSON,
EDWARD GILCHRIST.